Dec. 12, 1950  D. L. LAHR ET AL  2,534,135
FRONT VIEW MIRROR FOR VEHICLES
Filed Oct. 13, 1948
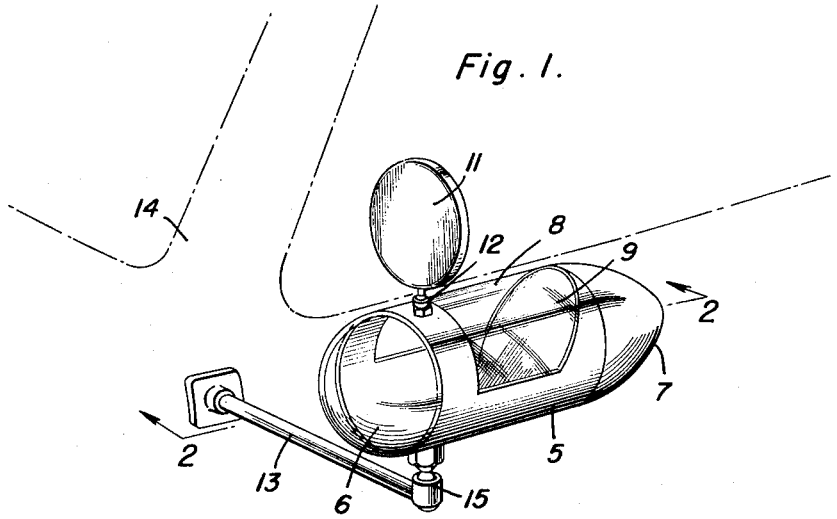
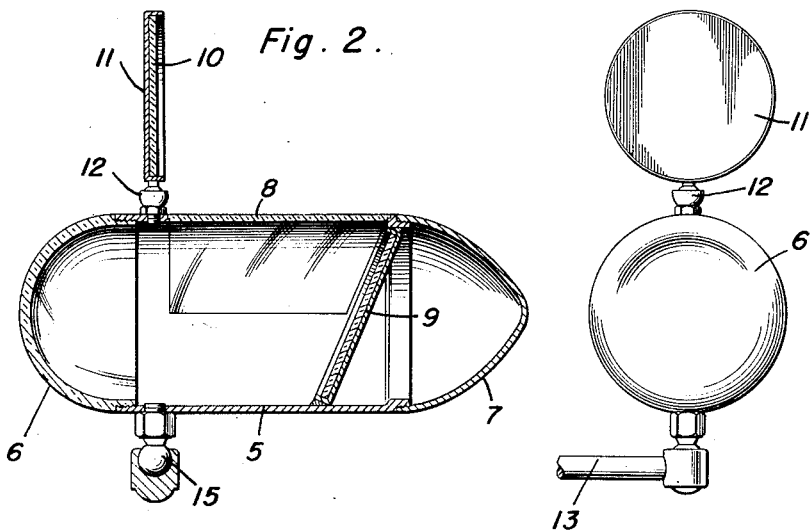
Inventors
David L. Lahr
August Schwitalla
By Clarence A. O'Brien
and Harvey B. Jacobson
Attorneys Patented Dec. 12, 1950

2,534,135

UNITED STATES PATENT OFFICE 2,534,135

FRONT VIEW MIRROR FOR VEHICLES

David L. Lahr and August Schwitalla,
St. Cloud, Minn.

Application October 13, 1948, Serial No. 54,256

2 Claims. (Cl. 88—87)

The present invention relates to new and useful improvements in mirrors for vehicles and more particularly to a novel mirror construction to enable a driver to see the highway ahead of a vehicle behind which he is traveling to determine whether the highway is clear for safely passing said forward vehicle.

An important object of the invention is to provide a front view mirror which is mounted below the line of vision of a driver to avoid interference with his view of objects in front of or at the side of his vehicle.

A further object is to provide a device of this character of simple and practical construction, which is neat and attractive in appearance, which may be installed on a vehicle without necessitating any changes or alterations in the construction thereof, inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the mirror in attached position;

Figure 2 is a longitudinal sectional view taken on a line 2—2 of Figure 1 and;

Figure 3 is a front elevational view.

Referring now to the drawings in detail, wherein for the purpose of illustration we have disclosed a preferred embodiment of our invention, the numeral 5 designates a cylindrically shaped housing closed at its front end by a dome-shaped glass or other transparent cap 6 and closed at its rear end by a substantially conical-shaped cap 7.

The housing 5 is of opaque material and provided in its top with a glass or other transparent window 8 and immediately behind which and mounted in the housing is a rearwardly nclned and forwardly facing mirror 9. A second mirror 10 is mounted in a frame 11 supported in an upright position on top of the housing 5 forwardly of window 8 by means of a ball and socket member 12 to provide a universal adjustment for the mirror. The mirror 10 faces rearwardly.

An arm 13 is attached at one end to the side of a vehicle body 14 to project horizontally outwardly therefrom and supports the housing 5 at its outer end by means of a ball and socket member 15 to provide a universal adjustment for the housing. The arm 13 is attached to the driver's side of the vehicle and in a position below the plane of his vision to prevent interference with his view forwardly or to the side of the vehicle.

In the operation of the device, with the housing 5 supported in the position indicated in Figure 1 of the drawings, the hghway ahead and beyond a vehicle immediately in front of a driver, will be reflected in mirrors 9 and 10 to thus enable the driver to see the road ahead without changing his normal position to thus determine whether it is safe to pass the vehicle ahead.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A front view mirror comprising a hollow cylindrical body closed at its rear end, a transparent cap at the front end of the body, a window in the top of the body, a mirror supported in the body, rearwardly of the window, and a mirror supported in an upstanding position on top of the body forwardly of the window, said mirrors facing each other to reflect an image from a point forwardly of the body onto the second named mirror.

2. A front view mirror comprising a hollow cylindrical body closed at its rear end, a transparent cap at the front end of the body, a window in the top of the body, an internal mirror supported in the body rearwardly of the window, an upstanding external mirror on top of the body forwardly of the window, said mirrors facing each other to reflect an image from a point forwardly of the body onto the external mirror, a universally adjustable support for the external mirror and a universally adjustable support for the front end of the body to support the body with its rear end in a trailing position.

DAVID L. LAHR.
AUGUST SCHWITALLA.

REFERENCES CITED

The following references are of record in the file of this patent:

UNITED STATES PATENTS

| Number | Name | Date |
| --- | --- | --- |
| 1,044,715 | Wearn | Nov. 19, 1912 |
| 1,226,537 | Kumauchi | May 15, 1917 |
| 1,877,109 | Wullenweber | Sept. 13, 1932 |
| 2,250,896 | Stokesbarry | July 29, 1941 |
| 2,252,161 | Borba | Aug. 12, 1947 |
| 2,501,067 | Lusebrink | Mar. 21, 1950 |